(12) United States Patent
Tong et al.

(10) Patent No.: US 12,308,450 B2
(45) Date of Patent: May 20, 2025

(54) BUTTON-TYPE BATTERY

(71) Applicant: Guangdong Mic-power New Energy Co., Ltd., Guangdong (CN)

(72) Inventors: Yan Tong, Guangdong (CN); Zhiyong Chen, Guangdong (CN)

(73) Assignee: Guangdong Mic-Power New Energy Co., Ltd., Guangdong (CN)

( * ) Notice: Subject to any disclaimer, the term of this patent is extended or adjusted under 35 U.S.C. 154(b) by 0 days.

(21) Appl. No.: 16/874,792

(22) Filed: May 15, 2020

(65) Prior Publication Data
US 2020/0365840 A1 Nov. 19, 2020

(30) Foreign Application Priority Data
May 15, 2019 (CN) .......................... 201920704681.8

(51) Int. Cl.
| | |
|---|---|
| *H01M 50/153* | (2021.01) |
| *H01M 50/109* | (2021.01) |
| *H01M 50/169* | (2021.01) |
| *H01M 50/184* | (2021.01) |
| *H01M 50/186* | (2021.01) |
| *H01M 50/193* | (2021.01) |

(52) U.S. Cl.
CPC ....... *H01M 50/153* (2021.01); *H01M 50/109* (2021.01); *H01M 50/169* (2021.01);
(Continued)

(58) Field of Classification Search
CPC ............. H01M 50/153; H01M 50/169; H01M 50/183; H01M 50/10; H01M 6/46;
(Continued)

(56) References Cited

U.S. PATENT DOCUMENTS 4,717,634 A * 1/1988 Daifuku .............. H01M 4/0461
429/213
9,799,858 B2 * 10/2017 Gaugler .............. H01M 50/109
(Continued)

FOREIGN PATENT DOCUMENTS

| CN | 2569349 Y | 8/2003 |
|---|---|---|
| CN | 102122718 A | 7/2011 |

(Continued)

OTHER PUBLICATIONS

C1.1M/C1.1:2012—Recommended Practices for Resistance Welding , 2012, American Welding Society (Year: 2012).*
(Continued)

*Primary Examiner* — Matthew T Martin
*Assistant Examiner* — Bartholomew A Hornsby
(74) *Attorney, Agent, or Firm* — SALIWANCHIK, LLOYD & EISENSCHENK

(57) ABSTRACT

A button-type battery of the present disclosure is provided with a package assembly and a rolled cell. In an actual application process, both a battery cup and a battery cover have a protective function, while a sealing plastic ring has a waterproof function. In addition, when an electrode tab needs welding, position of the electrode tab is determined, and the battery cup and/or the battery cover are subjected to resistance welding. Accordingly, a center welding layer is formed by resistance welding on a contact portion at a central position where the electrode tab of the rolled cell contacts the battery cup and/or the battery cover, and an edge welding layer is formed by resistance welding on a contact portion at an edge position where the electrode tab of the rolled cell contacts the battery cup and/or the battery cover.

11 Claims, 4 Drawing Sheets

(52) U.S. Cl.
CPC ....... *H01M 50/184* (2021.01); *H01M 50/186* (2021.01); *H01M 50/193* (2021.01)

(58) Field of Classification Search
CPC ......... H01M 10/0427; H01M 10/0436; H01M 50/0436; H01M 50/109; Y02P 70/50; Y02E 60/10
See application file for complete search history.

(56) References Cited

U.S. PATENT DOCUMENTS

| | | | | |
|---|---|---|---|---|
| 2013/0130066 | A1* | 5/2013 | Pytlik | H01M 6/50 429/7 |
| 2014/0315061 | A1* | 10/2014 | Wang | H01M 10/0587 429/94 |
| 2016/0190607 | A1* | 6/2016 | Wyser | H01M 10/052 29/623.5 |

FOREIGN PATENT DOCUMENTS

| | | | | |
|---|---|---|---|---|
| CN | 202695639 | U | * 1/2013 | |
| CN | 204885336 | U | 12/2015 | |
| CN | 106159350 | A | * 11/2016 | ........ H01M 10/0525 |
| CN | 107262927 | A | * 10/2017 | ............ B23K 26/22 |
| CN | 110336065 | A | 10/2019 | |
| JP | 2017130435 | A | * 7/2017 | ............. H01G 11/16 |

OTHER PUBLICATIONS

Chamberlain, A., et al., "Welding methods for electrical connections in battery systems." Dissertation, Uppsala Universitet, Jun. 2019, pp. 1-34.

* cited by examiner

BUTTON-TYPE BATTERY

CROSS-REFERENCE TO RELATED APPLICATION

This application claims priority to Chinese Patent Application No. 201920704681.8, filed on May 15, 2019, which is hereby incorporated by reference in its entirety.

TECHNICAL FIELD

The present disclosure relates to the technical field of batteries, and more specifically, to a button-type battery.

BACKGROUND

Currently, a battery, in the form of a cup, a reservoir, a container, or partial space in a complex container that contains an electrolyte and a metal electrode to generate current, refers to a device that can convert chemical energy into electrical energy. The battery has a positive electrode and a negative electrode. With the advancement of technology, the battery generally refers to a small device that can generate electrical energy, such as a solar cell. Performance parameters of the battery mainly include electromotive force, capacity, specific energy and resistance. Using the battery as an energy source, a stable voltage, a stable current, a long-term stable power supply, and a current less influenced by the environment can be obtained. The battery has a simple structure, is portable, is easy to charge and discharge, is not influenced by weather and temperature, and has stable and reliable performance, playing a great role in all aspects of modern social life.

An existing battery structure, especially a button-type battery structure, includes a battery cover, a battery shell and a rolled cell. After the button-type battery structure is assembled, electrode tabs of the rolled cell are required to be welded to the battery cover and the battery shell. However, most of existing electrode tab welding methods are implemented through laser welding. A laser is used for aligning a central position of the battery cover or the battery shell. The electrode tab is welded to the battery cover or the battery shell by the laser upon laser emission. Although it may be quick and efficient to weld the electrode tab by the laser welding, there are still some defects. First, the welding methods of laser welding are implemented by single spot welding. The position of the electrode tab of the rolled cell is required to be determined before performing the laser welding. If the position of the electrode tab is not accurately located, a "metal expulsion" phenomenon will occur in the electrode tab, that is, the electrode tab has not been completely welded to the battery cover or the battery shell, resulting in poor connection stability. Second, as the welding methods of laser welding are performed from outside to inside, if the position of the electrode tab to be welded is not accurately located, the laser tends to burn through the battery cover or the battery shell directly upon laser emission and directly radiates into the rolled cell, resulting in a significant potential security risk.

SUMMARY

The present disclosure aims to address the drawbacks in the prior art, and to provide a button-type battery which can prevent the phenomenon of "metal expulsion" from occurring in the electrode tab, has good welding stability and a high safety factor of welding.

The purpose of the present disclosure is achieved through the following technical solutions:

a button-type battery, comprising:
a package assembly including a battery cup, a sealing plastic ring and a battery cover, the sealing plastic ring being nested in the battery cup, the battery cover being clamped in the sealing plastic ring, and the battery cover being pressed against the sealing plastic ring, so that the sealing plastic ring being in tight contact with an inside of a sidewall of the battery cup, the battery cup and the battery cover together forming a battery cavity, and a welding layer being provided on the battery cup and/or the battery cover; and
a rolled cell placed in the battery cavity, with an electrode tab provided on the rolled cell;
wherein the welding layer is formed by resistance welding on a contact portion where the electrode tab of the rolled cell contacts the battery cup and/or the battery cover.

In an embodiment, the welding layer includes a center welding layer and an edge welding layer, the center welding layer being formed by resistance welding on a contact portion at a central position where the electrode tab of the rolled cell contacts the battery cup and/or the battery cover, and the edge welding layer being formed by resistance welding on a contact portion at an edge position where the electrode tab of the rolled cell contacts the battery cup and/or the battery cover.

In an embodiment, the center welding layer is formed by resistance welding on a contact portion at a central position where the electrode tab of the rolled cell contacts the battery cup, and the edge welding layer is formed by resistance welding on a contact portion at an edge position where the electrode tab of the rolled cell contacts the battery cup.

In an embodiment, the center welding layer is formed by resistance welding on a contact portion at a central position where the electrode tab of the rolled cell contacts the battery cover, and the edge welding layer is formed by resistance welding on a contact portion at an edge position where the electrode tab of the rolled cell contacts the battery cover.

In an embodiment, the center welding layer is formed by resistance welding on a contact portion at a central position where the electrode tab of the rolled cell contacts the battery cup and the battery cover, and the edge welding layer is formed by resistance welding on a contact portion at an edge position where the electrode tab of the rolled cell contacts the battery cup and battery cover.

In an embodiment, the center welding layer and the edge welding layer are dot-shaped.

In an embodiment, the edge welding layer is ring-shaped.

In an embodiment, the edge welding layer is disc-shaped.

In an embodiment, the edge welding layer includes a plurality of fan-shaped welding layers.

In an embodiment, the plurality of the fan-shaped welding layers is radially distributed about a center of the battery cover.

The advantages and beneficial effects of the present disclosure compared with the prior art are as follows:
the button-type battery and its manufacturing method of the present disclosure are provided with the package assembly and the rolled cell. In an actual application process, the battery cup and the battery cover both have a protective function, and the sealing plastic ring has a waterproof function. In addition, when the electrode tab is to be welded, the position of the electrode tab is determined, the battery cup and/or the battery cover are subjected to the resistance welding operation, so that a center welding layer is formed by resistance welding on a contact portion at a central position where the electrode tab of the rolled cell contacts the battery cup and/or the battery cover, and an edge welding layer is formed by resistance welding on a contact portion at an edge position where the electrode tab of the rolled cell contacts the battery cup and/or the battery cover. The presence of the center welding layer and the edge welding layer can prevent the "metal expulsion" phenomenon from occurring in the electrode tab. Compared with the traditional laser welding, the welding stability of the electrode tab and the safety factor of welding is enhanced, and there is no risk of the laser directly burning through the battery cup or the battery cover.

BRIEF DESCRIPTION OF THE DRAWINGS

In order to explain the technical solutions of the embodiments of the present disclosure more clearly, the embodiments with reference to the drawings if required will be briefly illustrated. It should be understood that the drawings hereinafter only show some embodiments of the present disclosure, and should not be seen as limitations to the scope of protection. For those of ordinary skill in the art, other related drawings can be obtained based on these drawings without creative work.

DETAILED DESCRIPTION

In order to facilitate understanding of the present disclosure, the present disclosure will be described more comprehensively below with reference to related drawings. The drawings show preferred embodiments of the present disclosure. However, the present disclosure can be implemented in many different fashions, and is not limited to the embodiments described herein. On the contrary, the purpose of providing these embodiments is to disclose the present disclosure more thoroughly and comprehensively.

It should be noted that when an element is referred to be "fixed" to another element, it can be directly on the another element or there can be an interposed element. When an element is considered to be "connected" to another element, it may be directly connected to the another element or there can be an interposed element. The terms "vertical", "horizontal", "left", "right" and similar expressions used herein are for illustrative purposes only and are not meant to be the only embodiments.

Unless otherwise defined, all technical and scientific terms used herein have the same meaning as commonly understood by those skilled in the technical field of the present disclosure. The terminology used in the description of the present disclosure herein is for the purpose of describing specific embodiments, and is not intended to limit the present disclosure. The term "and/or" as used herein includes any and all combinations of one or more related items.

Most of existing electrode tab welding methods are implemented by laser welding. A laser is used for aligning a central position of a battery cover or a battery shell. An electrode tab is welded to the battery cover or the battery shell by the laser upon laser emission. Although it can be quick and efficient to weld the electrode tab by the laser welding, there are some defects. First, the welding methods of laser welding are implemented by single spot welding. The position of the electrode tab of a rolled cell needs to be determined before the laser welding. If the position of the electrode tab is not accurately located, a "metal expulsion" phenomenon will occur in the electrode tab, that is, the electrode tab has not been completely welded to the battery cover or the battery shell, resulting in poor connection stability. Second, as the welding methods of laser welding are performed from outside to inside, if the position of the electrode tab to be welded is not accurately located, the laser tends to burn through the battery cover or the battery shell upon laser emission and directly radiates into the rolled cell, resulting in a significant potential security risk.

Figure 1:
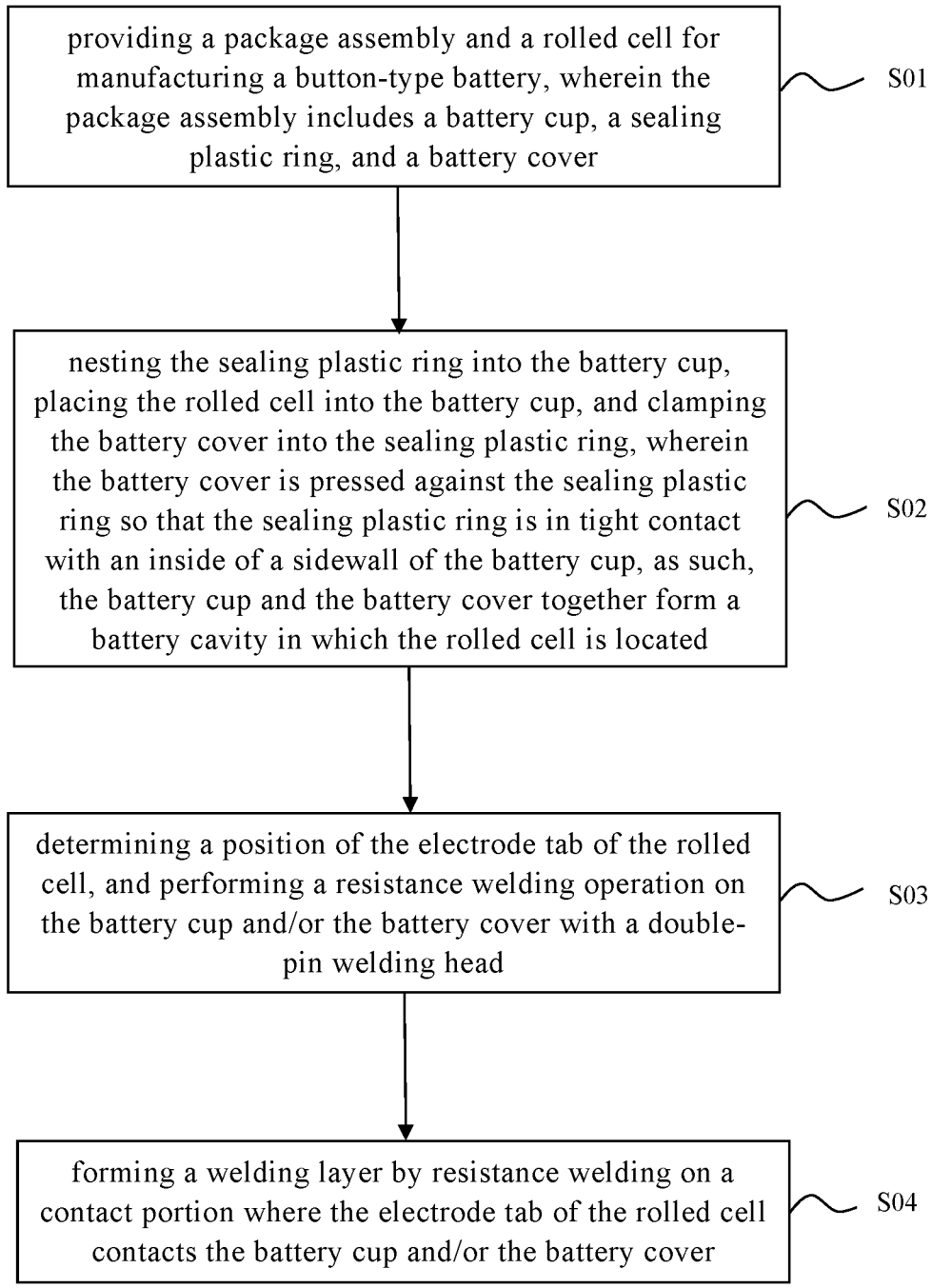
FIG. 1 is a flowchart of steps of a method for manufacturing a button-type battery of an embodiment of the present disclosure.
Figure 2:
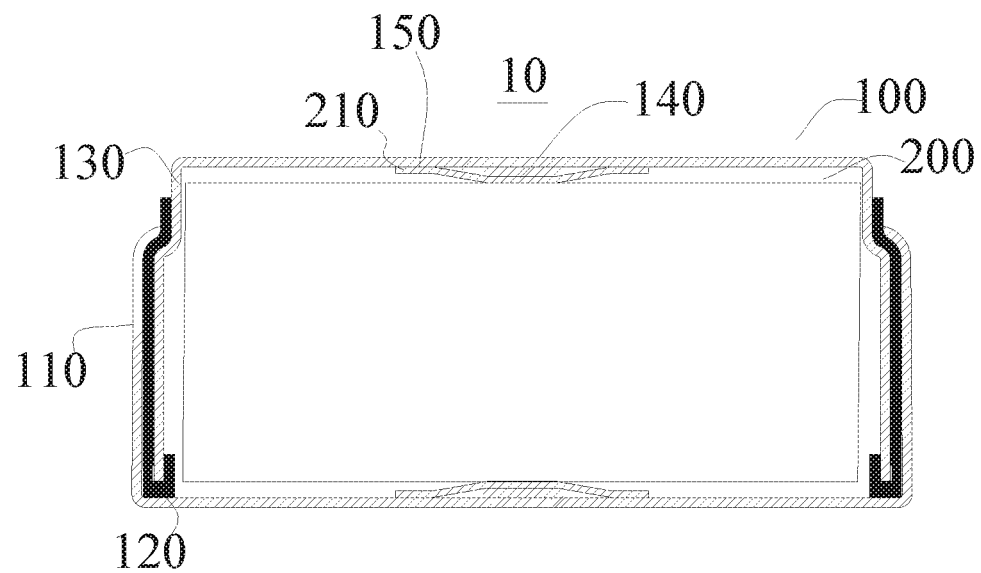
FIG. 2 is a schematic diagram of an internal structure of a button-type battery of an embodiment of the present disclosure.

Therefore, please refer to FIG. 1 and FIG. 2 for the above problems. This application discloses a method for manufacturing a button-type battery, including the following steps:

Step S01: providing a package assembly 100 and a rolled cell 200 for manufacturing a button-type battery 10, wherein the package assembly 100 includes a battery cup 110, a sealing plastic ring 120, and a battery cover 130.

It should be noted that the package assembly 100 functions to package and protect the rolled cell 200; and the rolled cell 200 functions to provide voltage and output the voltage to an external consumer device.

Step S02: nesting the sealing plastic ring 120 into the battery cup 110, placing the rolled cell 200 into the battery cup 110, and clamping the battery cover 130 into the sealing plastic ring 120, wherein the battery cover 130 is pressed against the sealing plastic ring 120 so that the sealing plastic ring 120 is in tight contact with an inside of a sidewall of the battery cup 110. As such, the battery cup 110 and the battery cover 130 together form a battery cavity in which the rolled cell 200 is located.

It should be noted that when the button-type battery 10 is being assembled, the sealing plastic ring 120 is nested into the battery cup 110, the rolled cell 200 is placed into the battery cup 110, and the battery cover 130 is clamped into the sealing plastic ring 120. Under this condition, the battery cover 130 will be pressed against the sealing plastic ring 120, and the sealing plastic ring 120 will be in tight contact with the inside of a sidewall of the battery cup 110 under the pressure from the battery cover 130 to the sealing plastic ring 120. That is, the sealing plastic ring 120 is tightly fitted to the battery cup 110 and the battery cover 130 respectively, greatly improving waterproof performance of the sealing plastic ring 120; meanwhile, the sealing plastic ring 120 can also provide the battery cover 130 with a friction force as appropriate to prevent the battery cover 130 from being detached from the battery cup 110 under a certain external force which may result in leakage of electrolyte of the rolled cell 200.

Step S03: determining a position of an electrode tab 210 of the rolled cell 200, and performing a resistance welding operation on the battery cup 110 and/or the battery cover 130 with a double-pin welding head 20;

Wherein, a welding layer is formed by resistance welding on a contact portion where the electrode tab 210 of the rolled cell 200 contacts the battery cup 110 and/or the battery cover 130;

Specifically, the welding layer includes a center welding layer 140 and an edge welding layer 150. The center welding layer is formed by resistance welding on a contact portion at a central position where the electrode tab of the rolled cell contacts the battery cup and/or the battery cover. The edge welding layer is formed by resistance welding on a contact portion at an edge position where the electrode tab of the rolled cell contacts the battery cup and/or the battery cover.

It should be noted that, as mentioned above, most of the existing electrode tab welding methods are implemented by laser welding. After determining the position of the electrode tab of the rolled cell, a laser emitter is used for aligning the central position of the battery cover or the battery shell. The electrode tab is welded to the battery cover or the battery shell upon laser emission. However, there are certain defects in the above method. First, the position of the electrode tab of the rolled cell has to be determined. If the determination of the position of the electrode tab is inaccurate, a "metal expulsion" phenomenon will occur in the electrode tab, that is to say, the electrode tab has not been completely welded to the battery cover or the battery shell, resulting in poor connection stability. Second, if determination of the position of the electrode tab is inaccurate during welding, the laser tends to burn through the battery cover or the battery shell upon laser emission and directly radiates into the rolled cell, resulting in significant potential security risk.

Figure 3:
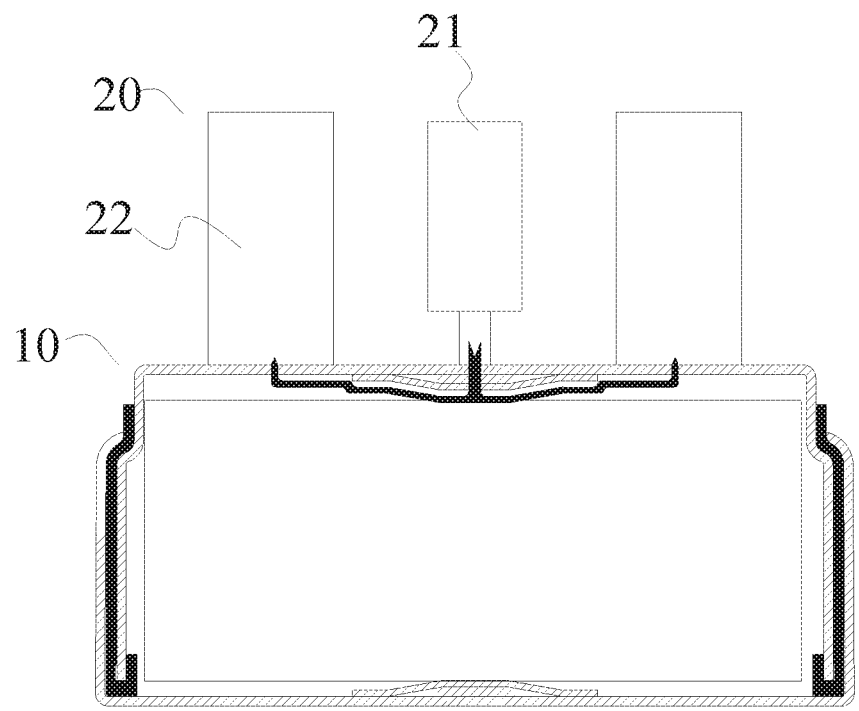
FIG. 3 is a schematic diagram of the use of a button-type battery and a double-pin welding head in resistance welding according to an embodiment of the present disclosure.
Figure 4:
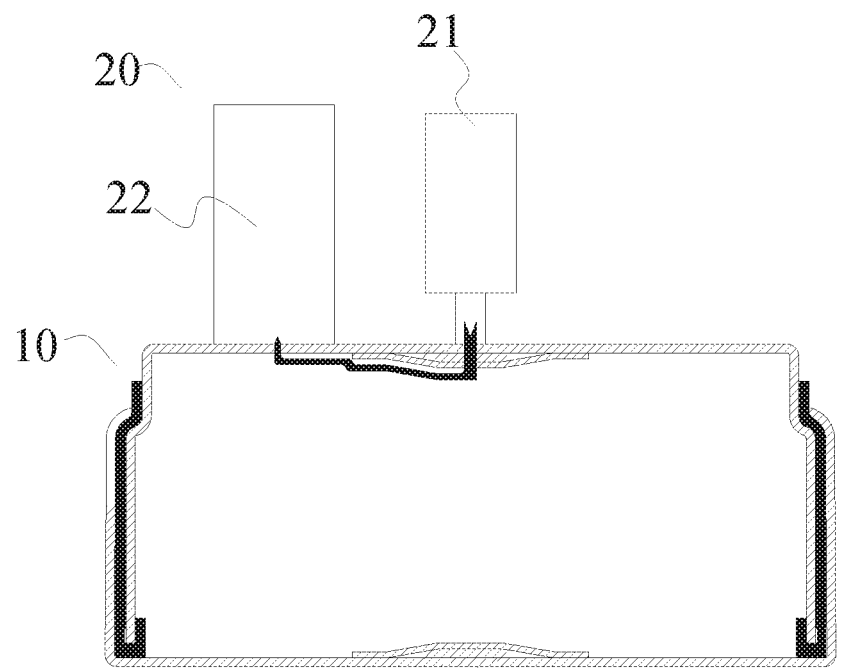
FIG. 4 is a schematic diagram of the use of a button-type battery and a double-pin welding head in resistance welding according to another embodiment of the present disclosure.
Figure 5:
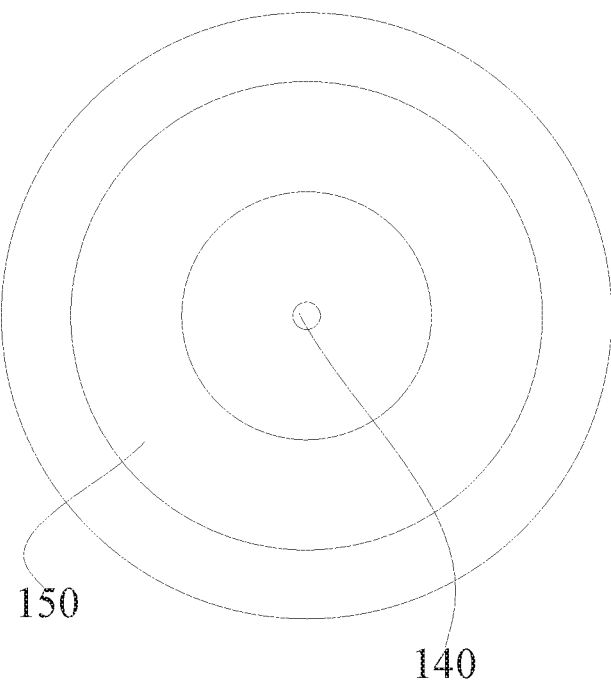
FIG. 5 is a schematic structural view of a center welding layer and an edge welding layer in an embodiment of the present disclosure.
Figure 6:
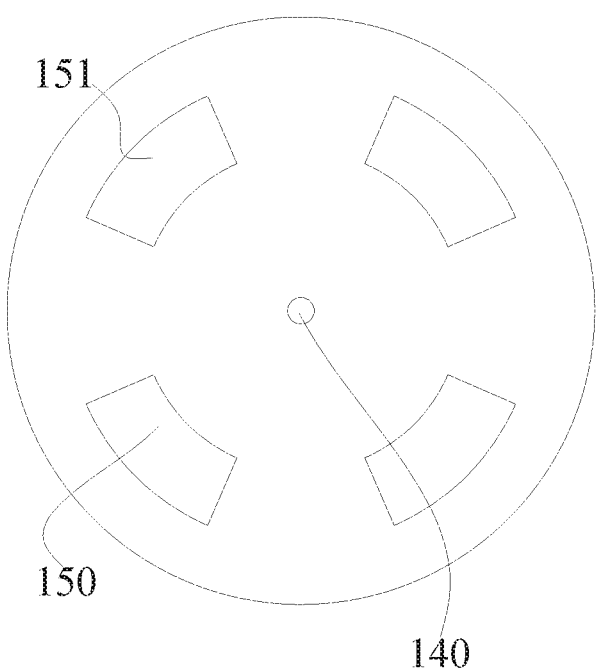
FIG. 6 is a schematic structural view of a center welding layer and an edge welding layer in another embodiment of the present disclosure.
Figure 7:
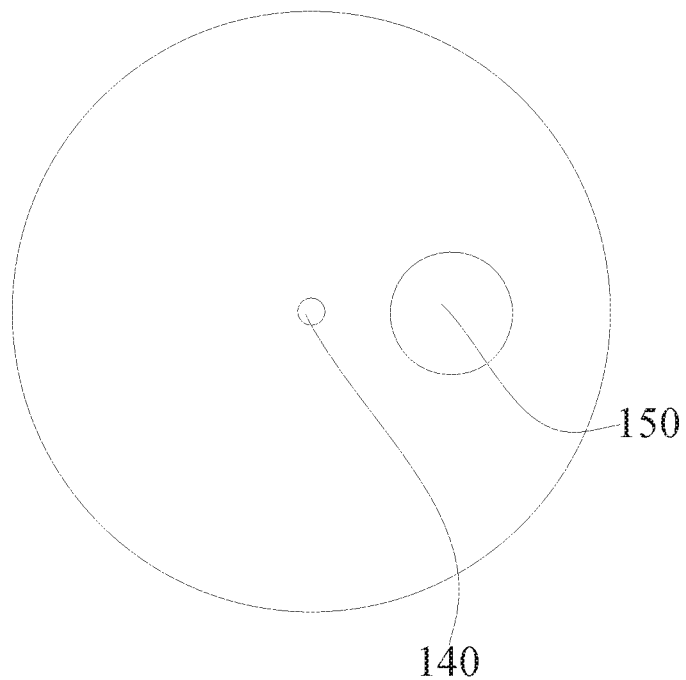
FIG. 7 is a schematic structural view of a center welding layer and an edge welding layer in another embodiment of the present disclosure.

In view of the above problems, resistance welding is adopted in the present application. Specifically, after assembly of the package assembly 100 and the rolled cell 200, the position of the electrode tab 210 of the rolled cell 200 is determined, and a double-pin welding head 20 is used for performing the resistance welding operation on the battery cup 110 and/or the battery cover 130. See FIG. 2, FIG. 3 and FIG. 4, the double-pin welding head 20 includes a positive electrode welding head 21 and a negative electrode welding head 22. After the position of the electrode tab 210 of the rolled cell 200 is determined, the positive electrode welding head 21 is aligned to a part of the electrode tab at a central position of the battery cup 110 and/or the battery cover 130, and the negative electrode welding head 22 is aligned to a part of the electrode tab at an edge position of the battery cup 110 and/or the battery cover 130. Of course, the positive electrode welding head 21 and the negative electrode welding head 22 can be interchanged as appropriate in an actual assembly process, that is to say, the negative electrode welding head 22 is aligned to the part of the electrode tab at the central position of the battery cup 110 and/or the battery cover 130, and the positive electrode welding head 21 is aligned to the part of the electrode tab at the edge position of the battery cup 110 and/or the battery cover 130. Upon energizing of the double-pin welding head 20, a conductive path is formed among the positive electrode welding head 21, the battery cup 110 and the negative electrode welding head 22, or among the positive electrode welding head 21, the battery cover 130 and the negative electrode welding head 22. The resistance welding operation is performed on the electrode tab 210, as such, a center welding layer 140 is formed by resistance welding on a contact portion at a central position where the electrode tab 210 of the rolled cell 200 contacts the battery cup 110 and/or the battery cover 130, and an edge welding layer 150 is formed by resistance welding on a contact portion at an edge position where the electrode tab 210 of the rolled cell 200 contacts the battery cup 110 and/or the battery cover 130. It should be emphasized that the formation of the center welding layer 140 and the edge welding layer 150 can stabilize the connection between the electrode tab 210 of the rolled cell 200 and the battery cup 110 and/or the battery cover 130. Compared with traditional single-spot laser welding, this application can realize a more stable welding of the electrode tab 210, and can well prevent the "metal expulsion" phenomenon from occurring in the electrode tab 210, that is, to prevent the phenomenon that the electrode tab 210 has not been successfully welded to the battery cup 100 and/or the battery cover 130. Further, due to the formation of the center welding layer 140 and the edge welding layer 150, compared with traditional single-spot laser welding, this application does not require accurate determination of the position of the electrode tab 210, and the welding operation on the electrode tab 210 is completed by covering the battery cup 110 and/or the battery cover 130 with a large area of the center welding layer 140 and the edge welding layer 150. Still further, the traditional laser welding is implemented by welding from outside to inside, that is, upon laser emission, the laser gradually burns through the battery cup 110 and/or the battery cover 130 to the electrode tab 210 to form a welding bead, which is transitioned slowly from the battery cup 110 and/or the battery cover 130 to the electrode tab 210, that is, the electrode tab 210 is welded by the laser from outside to inside. If determination of the position of the electrode tab is inaccurate, the laser tends to burn through the battery cover 130 or the battery cup 110 upon laser emission and directly radiates into the rolled cell 200, resulting in significant potential safety risk. In this application, the conductive path is formed among the positive electrode welding head 21, the battery cup 110 and the negative electrode welding head 22, or among the positive electrode welding head 21, the battery cover 130 and the negative electrode head 22. Upon energizing of the double-pin welding head 20, the part of the electrode tab 210 at the central position is welded to the battery cup 110 and/or the battery cover 130, and the center welding layer 140 is formed. The part of the electrode tab 210 at the edge position is welded to the battery cup 110 and/or the battery cover 130, and the edge welding layer 150 is formed. Compared with the traditional laser welding which forms a welding bead, in the welding layer of the present application, the central welding layer 140 and the edge welding layer 150 are at the contact portions where the electrode tab and the battery cup 110 and/or the battery cover 130 are welded together upon energization. The welding layer gradually spreads around with the lapse of energization time, that is, the welding layer has a gradually increasing area as long as it is energized. By increasing an area of the welding layer welded to the electrode tab 210, the welding stability between the welding layer and the electrode tab 210 is enhanced. Meanwhile, in the present application, the welding layer gradually spreads from center to edge; compared with the traditional laser welding which is performed from outside to inside, in the present application the laser can be well prevented from directly burning through the battery cup 110 and/or the battery cover 130 and into the rolled cell 200 when the position of the electrode tab 210 is not accurately located, and further prevents explosion in the rolled cell 200 which would cause a corresponding safety accident. This application can well prevent the occurrence of the above-mentioned situation. The welding operation on the electrode tab 210 is completed by means of the welding layer spreading around, refraining from laser burning through the battery cup 110 and/or the battery cover 130. In the present application, the welding process is performed from inside to outside instead of from outside to inside, with a greatly increased safety factor of welding.

According to the method of manufacturing the button-type battery described above, the button-type battery 10 shown in FIG. 2 can be manufactured. The button-type battery 10 includes the package assembly 100 and the rolled cell 200.

As such, it should be noted that the package assembly 100 functions to package and protect the rolled cell 200. The rolled cell 200 functions to provide the voltage and output the voltage to the external power consumer.

Please refer to FIG. 2 again. The package assembly 100 includes the battery cup 110, the sealing plastic ring 120 and the battery cover 130. The sealing plastic ring 120 is nested in the battery cup 110, and the battery cover 130 is clamped in the sealing plastic ring 120. The battery cover 130 is used for pressing against the sealing plastic ring 120, so that the sealing plastic ring 120 is in tight contact with the inside of a sidewall of the battery cup 110. The battery cup 110 and the battery cover 120 together form a battery cavity, and there are provided welding layers on the battery cup 110 and/or the battery cover 130.

Specifically, the welding layer includes the center welding layer 140 and the edge welding layer 150. The center welding layer is formed by resistance welding on a contact portion at a central position where the electrode tab of the rolled cell contacts the battery cup and/or the battery cover, and the edge welding layer is formed by resistance welding on a contact portion at an edge position where the electrode tab of the rolled cell contacts the battery cup and/or the battery cover.

It should be noted that the battery cup 110 and the battery cover 130 both function to package and protect. The battery cup 110 and the battery cover 130 together form the battery cavity, and the battery cavity is used for placing the rolled cell 200. The battery cup 110 and the battery cover 130 can prevent external objects from sudden physical contact with the rolled cell 200 directly and protect the rolled cell 200 from being damaged. The sealing plastic ring 120 functions as a waterproof to prevent external conductors such as liquid in the form of water droplets and the like from penetrating into the battery cup 110 and causing short-circuit to the rolled cell 200.

Please refer to FIG. 2 again. The rolled cell 200 is placed in the battery cavity, and the electrode tab 210 is provided on the rolled cell 200. The center layer 140 is formed by resistance welding on a contact portion at a central position where the electrode tab 210 of the rolled cell 200 contacts the battery cup 110 and/or the battery cover 130, and the edge welding layer 150 is formed by resistance welding on a contact portion at an edge position where the electrode tab 210 of the rolled cell 200 contacts the battery cup 110 and/or the battery cover 130.

It should be noted that the rolled cell 200 functions to provide the voltage and output the voltage to the external consumer device, and the voltage of the rolled cell 200 is output to the external consumer device through the electrode tab 210. During a welding operation on the button-type battery, the position of the electrode tab 210 of the rolled cell 200 is determined, and the welding operation on the electrode tab 210 is performed, as such, a center welding layer 140 is formed by resistance welding on a contact portion at a central position where the electrode tab 210 of the rolled cell 200 contacts the battery cup 110 and/or the battery cover 130, and an edge welding layer 150 is formed by resistance welding on a contact portion at an edge position where the electrode tab 210 of the rolled cell 200 contact the battery cup 110 and/or the battery cover 130. The formation of the center welding layer 140 and the edge welding layer 150 can stabilize the connection of the electrode tab 210 of the rolled cell 200 and the battery cup 110 and/or the battery cover 130. Compared with the traditional single-spot laser welding, this application can realize a more stable welding of the electrode tab 210, and can well prevent the "metal expulsion" phenomenon, that is the electrode tab 210 has not been successfully welded to the battery cup 100 and/or the battery cover 130, from occurring in the electrode tab 210. Further, due to the formation of the center welding layer 140 and the edge welding layer 150, compared with the traditional single-spot laser welding, this application does not require accurate determination of the position of the electrode tab 210, and the welding operation on the electrode tab 210 is completed by covering the battery cup 110 and/or the battery cover 130 with a large area of the center welding layer 140 and the edge welding layer 150. Still further, the traditional laser welding is implemented by welding from outside to inside, that is, upon the laser emission, the laser gradually burns through the battery cup 110 and/or the battery cover 130 to the electrode tab 210 to form a welding bead, which is transitioned slowly from the battery cup 110 and/or the battery cover 130 to the electrode tab 210, that is, the electrode tab 210 is welded by the laser from outside to inside. If determination of the position of the electrode tab is inaccurate, the laser tends to burn through the battery cover 130 or the battery cup 110 upon the laser emission and directly radiates into the rolled cell 200, resulting in significant potential safety risk. In this application, the conductive path is formed among the positive electrode welding head 21, the battery cup 110 and the negative electrode welding head 22, or among the positive electrode welding head 21, the battery cover 130 and the negative electrode head 22. Upon energizing of the double-pin welding head 20, the part of the electrode tab 210 at the central position is welded to the battery cup 110 and/or the battery cover 130, and the center welding layer 140 is formed. The part of the electrode tab 210 at the edge position is welded to the battery cup 110 and/or the battery cover 130, and the edge welding layer 150 is formed. Compared with the traditional laser welding which forms a welding bead, in the welding layer of the present application, the central welding layer 140 and the edge welding layer 150 are at the contact portions where the electrode tab and the battery cup 110 and/or the battery cover 130 are welded together upon energization. The welding layer gradually spreads around with the lapse of energization time, that is, the welding layer has a gradually increasing area as long as it is energized. By increasing the area of the welding layer welded to the electrode tab 210, the welding stability between the welding layer and the electrode tab 210 is enhanced. Meanwhile, in the present application the welding layer gradually spreads from center to edge, compared with the traditional laser welding which is performed from outside to inside, in the present application the laser can be well prevented from directly burning through the battery cup 110 and/or the battery cover 130 and into the rolled cell 200 when the position of the electrode tab 210 is not accurately located, so as to result in an explosion in the rolled cell 200 which would cause a corresponding safety accident. This application can well prevent the occurrence of the above-mentioned situation. The welding operation on the electrode tab 210 is completed by means of the welding layer spreading around, refraining from laser burning through the battery cup 110 and/or the battery cover 130. In the present application, the welding process is performed from inside to outside instead of from outside to inside, with a greatly increased safety factor of welding.

Further, in an embodiment, both the center welding layer 140 and the edge welding layer 150 are provided on the battery cup 110;

wherein the center welding layer 140 is formed by resistance welding on a contact portion at a central position where the electrode tab 210 of the rolled cell 200 contacts the battery cup 110, and the edge welding layer 150 is formed by resistance welding on a contact portion at an edge position where the electrode tab 210 of the rolled cell 200 contacts the battery cup 110.

As such, it should be noted that in an embodiment, the center welding layer 140 and the edge welding layer 150 may be provided only on the battery cup 110, and not provided on the battery cover 130. The function and formation of the center welding layer 140 and the edge welding layer 150 are not repeated in detail, please refer to the function and formation of the center welding layer 140 and the edge welding layer 150 mentioned above.

Further, please refer to FIG. 2 again, in an embodiment, both the center welding layer 140 and the edge welding layer 150 are provided on the battery cover 130;

wherein the center welding layer 140 is formed by resistance welding on a contact portion at a central position where the electrode tab 210 of the rolled cell 200 contacts the battery cover 130, and the edge welding layer 150 is formed by resistance welding on a contact portion at an edge position where the electrode tab 210 of the rolled cell 200 contacts the battery cover 130.

As such, it should be noted that in an embodiment, it is possible for both the center welding layer 140 and the edge welding layer 150 to be provided only on the battery cover 130, but not on the battery cup 110. The function and formation of the center welding layer 140 and the edge welding layer 150 are not repeated in detail, please refer to the function and formation of the center welding layer 140 and the edge welding layer 150 mentioned above.

Further, in an embodiment, the center welding layer 140 and the edge welding layer 150 are provided on the battery cup 110 and the battery cover 130;

wherein the center welding layer 140 is formed by resistance welding on a contact portion at a central position where the electrode tab 210 of the rolled cell 200 contacts the battery cup 110 and the battery cover 130, and the edge welding layer 150 is formed by resistance welding on a contact portion at an edge position where the electrode tab 210 of the rolled cell 200 contacts the battery cup 110 and the battery cover 130.

As such, it should be noted that in an embodiment, the center welding layer 140 and the edge welding layer 150 may be provided both on the battery cup 110 and the battery cover 130. The function and formation of the center welding layer 140 and the edge welding layer 150 are not repeated in detail, please refer to the function and formation of the center welding layer 140 and the edge welding layer 150 mentioned above.

It should also be noted that when both the center welding layer 140 and the edge welding layer 150 are provided not only on the battery cup 110 but also on the battery cover 130, it becomes possible for a user to have positive and negative electrodes of the button-type battery 10 directly led out of the battery cup 110 and the battery cover 130. For example, when the battery cup 110 is connected to a positive electrode tab of the rolled cell 210, the battery cup 110 functions as the general positive electrode of the button cell 10; and when the battery cover 130 is connected to a negative electrode tab of the rolled cell 210, the battery cover 130 functions as the general negative electrode of the button-type battery 10. As another example, when the battery cup 110 is connected to the negative electrode tab of the rolled cell 210, the battery cup 110 functions as the general negative electrode of the button-type battery 10, and when the battery cover 130 is connected to the positive electrode tab of the rolled cell 210, the battery cover 130 functions as the general positive electrode of the button-type battery 10. In a practical manufacturing process, it is possible to choose whether to use the battery cup 110 or the battery cover 130 as the general positive electrode as appropriate according to actual production needs.

It should also be noted that regardless of the fact that the center welding layer 140 and the edge welding layer 150 are provided on the battery cup 110, or on the battery cover 130, or both on the battery cup 110 and the battery cover 130, the function of the center welding layer 140 and the edge welding layer 150 are the same, that is to prevent the "metal expulsion" phenomenon from occurring on the electrode tab 210 of the rolled cell 200 and to prevent the battery cup 110 and/or the battery cover 130 from being broken through.

Please refer to FIG. 2, FIG. 5, FIG. 6 and FIG. 7. As the double-needle welding head 20 is required during resistance welding on the electrode tab 210 of the rolled cell 200, correspondingly, when the electrode tab 210 is subjected to resistance welding, correspondingly formed the center welding layer 140 and the edge welding layer 150 would have shapes that are to some extent influenced by the double-pin welding head 20. For example, when both the center welding layer 140 and the edge welding layer are dot-shaped, correspondingly, the positive electrode welding head 21 or the negative electrode welding head 22 of the double-pin welding head 20 for welding on the center welding layer 140 are also dot-shaped. As another example, when the edge welding layer 150 is ring-shaped, correspondingly, the positive electrode welding head 21 or the negative electrode welding head 22 of the double-pin welding head 20 for welding on the center welding layer 140 is in the shape of the circular ring. As another example, when the edge welding layer 150 is in the shape of a disc, the positive electrode welding head 21 or the negative electrode welding head 22 of the double-pin welding head 20 for welding on the center welding layer 140 is in the shape of the disc. As another example, please refer to FIG. 6 again, when the edge welding layer 150 includes a plurality of fan-shaped welding layers 151 radially distributed about a center of the battery cover, every two adjacent fan-shaped welding layers being equidistant, as such, the positive electrode welding head 21 or the negative electrode welding head 22 of the double-pin welding head 20 for welding on the center welding layer 140 includes a plurality of fan-shaped welding pads radially distributed about a center of the positive electrode welding head 21 or a center of the negative electrode welding head 22. It should be emphasized that the shape of the double-needle welding head 20 can be flexibly set as appropriate according to actual production needs.

It should also be noted that in order to increase the speed of assembling the button-type battery 10, in an embodiment, a rolling groove is provided on the battery cup 110, so that the inside of a sidewall of the battery cup 110 is recessed inward to form a clamp-on step. The sealing plastic ring 120 is nested in the clamp-on step, the battery cover 130 is clamped in the sealing plastic ring 120, and the battery cover 130 is used for pressing against the sealing plastic ring 120, so that the sealing plastic ring 120 is in tight contact with the clamp-on step.

It should be noted that the rolling groove is such that the inside of a sidewall of the battery cup 110 is recessed inward to form the clamp-on step. When the battery cover 130 is being assembled, it is only necessary to press down the battery cover 130 with an external force in order to assemble the battery cover 130 on the battery cup 110. Accordingly, quick assembly can be achieved with the fact that the battery cover 130 can be stably fixed in the battery cup 110 by means of a mutual cooperative force among the clamp-on step, the battery cover 130 and the sealing plastic ring 120. Meanwhile, the clamp-on step can prevent the battery cover 130 from being excessively pressed down and prevent squeezing and damaging the rolled cell 200 provided in the battery cavity. In addition, when air pressure inside the battery cavity is too high, the battery cover 130 can be detached from the battery cup 110 under the action of the air pressure and performs a pressure relief operation so as to prevent the button-type battery 10 from over-pressurization.

It should also be noted that in order to prevent the battery cover 130 from squeezing the rolled cell 200 and prevent the rolled cell 200 from expanding, in an embodiment, the button-type battery 10 further includes a central post, a through hole is provided in the rolled cell 200, the central post is located in the through hole, and an end of the central post abuts against the electrode tab 210 of the rolled cell 200.

It should be noted that when the battery cover 130 is assembled and excessively pressed downwards, the center post can limit the position of the battery cover 130 to prevent the battery cover 130 from being further pressed down to damage the rolled cell 200. In addition, the center post can prevent the rolled cell 200 from expanding due to unexpected factors and damaging the rolled cell 200.

The button-type battery and its manufacturing method of the present disclosure are provided with the package assembly and the rolled cell. In an actual application process, both the battery cup and the battery cover have a protective function, while the sealing plastic ring has a waterproof function. In addition, when the electrode tab needs welding, the position of the electrode tab is determined, and the battery cup and/or the battery cover are subjected to resistance welding. Accordingly, a center welding layer is formed by resistance welding on a contact portion at a central position where the electrode tab of the rolled cell contacts the battery cup and/or the battery cover, and an edge welding layer is formed by resistance welding on a contact portion at an edge position where the electrode tab of the rolled cell contacts the battery cup and/or the battery cover. The presence of the center welding layer and the edge welding layer can prevent the "metal expulsion" phenomenon from occurring on the electrode tab. Compared with the traditional laser welding, the welding stability of the electrode tab is greatly enhanced, thereby ensuring a higher safety factor of welding with no risk of directly burning through the battery cup or the battery cover by a laser beam.

The above-mentioned embodiments are only several embodiments of the present disclosure, and descriptions thereof are specific and detailed, but they should not be construed as limiting the scope of the present disclosure. It should be noted that for those of ordinary skill in the art, a number of modifications and improvements falling within the protection scope of the present disclosure can also be implemented without departing from the concept of the present disclosure. Therefore, the protection scope of the present disclosure shall be subject to the appended claims.

The invention claimed is:

1. A button-type battery, comprising:
a package assembly including a battery cup, a sealing plastic ring and a battery cover, the sealing plastic ring being nested in the battery cup, the battery cover being clamped in the sealing plastic ring, and the battery cover being pressed against the sealing plastic ring so that the sealing plastic ring being in tight contact with an inside of a sidewall of the battery cup, the battery cup and the battery cover together forming a battery cavity, and a welding layer being provided on the battery cup and/or the battery cover; and
a rolled cell placed in the battery cavity, with an electrode tab provided on the rolled cell, an axial direction of the rolled cell is parallel to an axial direction of the package assembly, and the electrode tab is provided on an end face of the axial direction of the rolled cell;
wherein the welding layer is formed by welding on a contact portion where the electrode tab of the rolled cell contacts the battery cup and/or the battery cover, the welding layer includes a center welding layer and an edge welding layer formed by a double-pin welding head for resistance welding operation, double-pin welding is applied from an outer side of the package assembly, the center welding layer is located at a central position of the rolled cell, and the edge welding layer is located at an edge position of the rolled cell,
wherein the inside of the sidewall of the battery cup is recessed inward to form a clamp-on step, the sealing plastic ring is nested in the clamp-on step, the battery cover is clamped in the sealing plastic ring, and the battery cover is used for pressing against the sealing plastic ring, so that the sealing plastic ring is in tight contact with the clamp-on step,
wherein a sidewall of the battery cover protrudes outside to form a step which is located below the clamp-on step, and the step and the clamp-on step are used for pressing against the sealing plastic ring, and
wherein the sealing plastic ring protrudes from the clamp-on step.

2. The button-type battery according to claim 1, wherein the center welding layer is formed by welding on a contact portion at a central position where the electrode tab of the rolled cell contacts the battery cup.

3. The button-type battery according to claim 2, wherein the edge welding layer is formed by welding on a contact portion at an edge position where the electrode tab of the rolled cell contacts the battery cup.

4. The button-type battery according to claim 1, wherein the center welding layer is formed by welding on a contact portion at a central position where the electrode tab of the rolled cell contacts the battery cover.

5. The button-type battery according to claim 1, wherein the center welding layer is formed by welding on a contact portion at a central position where the electrode tab of the rolled cell contacts the battery cup and the battery cover, and the edge welding layer is formed by welding on a contact portion at an edge position where the electrode tab of the rolled cell contacts the battery cup and battery cover.

6. The button-type battery according to claim 1, wherein the edge welding layer is disc-shaped.

7. The button-type battery according to claim 1, wherein the edge welding layer includes a plurality of fan-shaped welding layers, each of which is sector-shaped.

8. The button-type battery according to claim 7, wherein the plurality of the fan-shaped welding layers are radially distributed about a center of the battery cover.

9. The button-type battery according to claim 1, wherein the edge welding layer is formed by welding on a contact portion at an edge position where the electrode tab of the rolled cell contacts the battery cover.

10. The button-type battery according to claim 1, wherein the welding layer gradually spreads from center to edge.

11. The button-type battery according to claim 1, wherein the double-pin welding head includes a positive electrode welding head and a negative electrode welding head, after the position of the electrode tab of the rolled cell is determined, the positive electrode welding head is aligned to a part of the electrode tab at a central position of the battery cup and/or the battery cover, and the negative electrode welding head is aligned to a part of the electrode tab at an edge position of the battery cup and/or the battery cover.

* * * * *